April 21, 1970  C. E. WARREN  3,508,244
VISUAL DISPLAY APPARATUS AND CONTROL THEREFOR
Filed Dec. 2, 1965  5 Sheets-Sheet 1
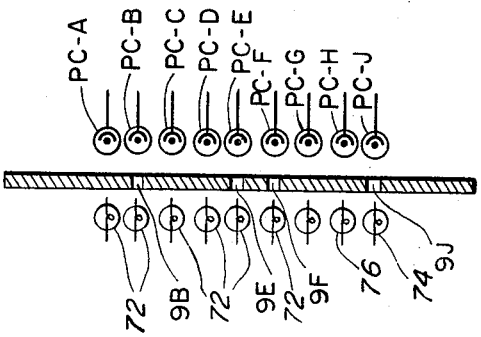
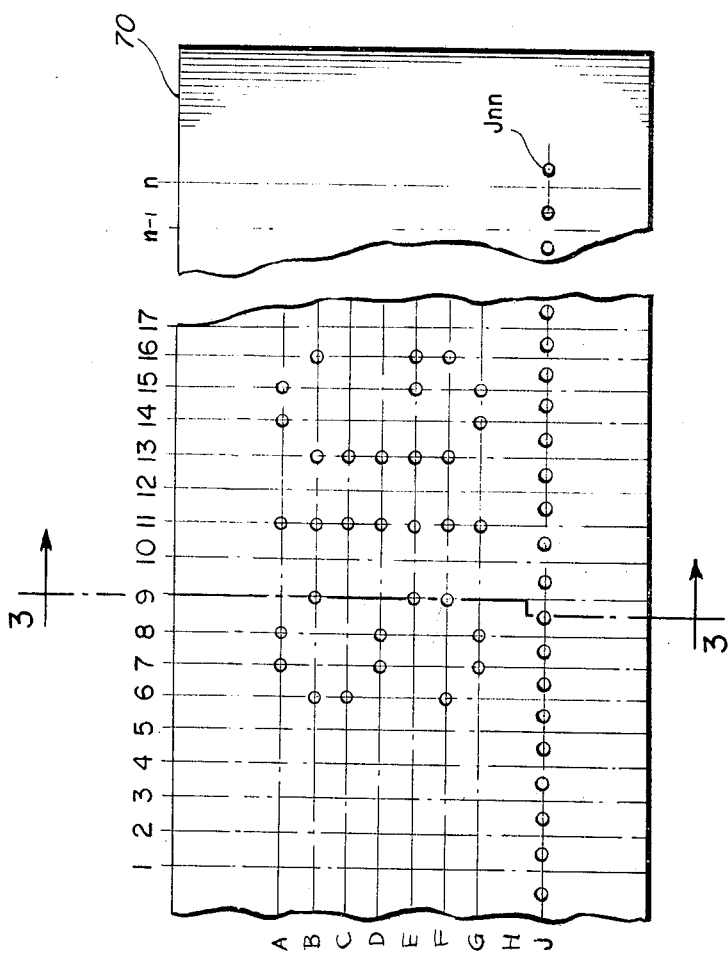
INVENTOR
CHARLES E. WARREN
BY Silverman + Cass
ATTORNEYS

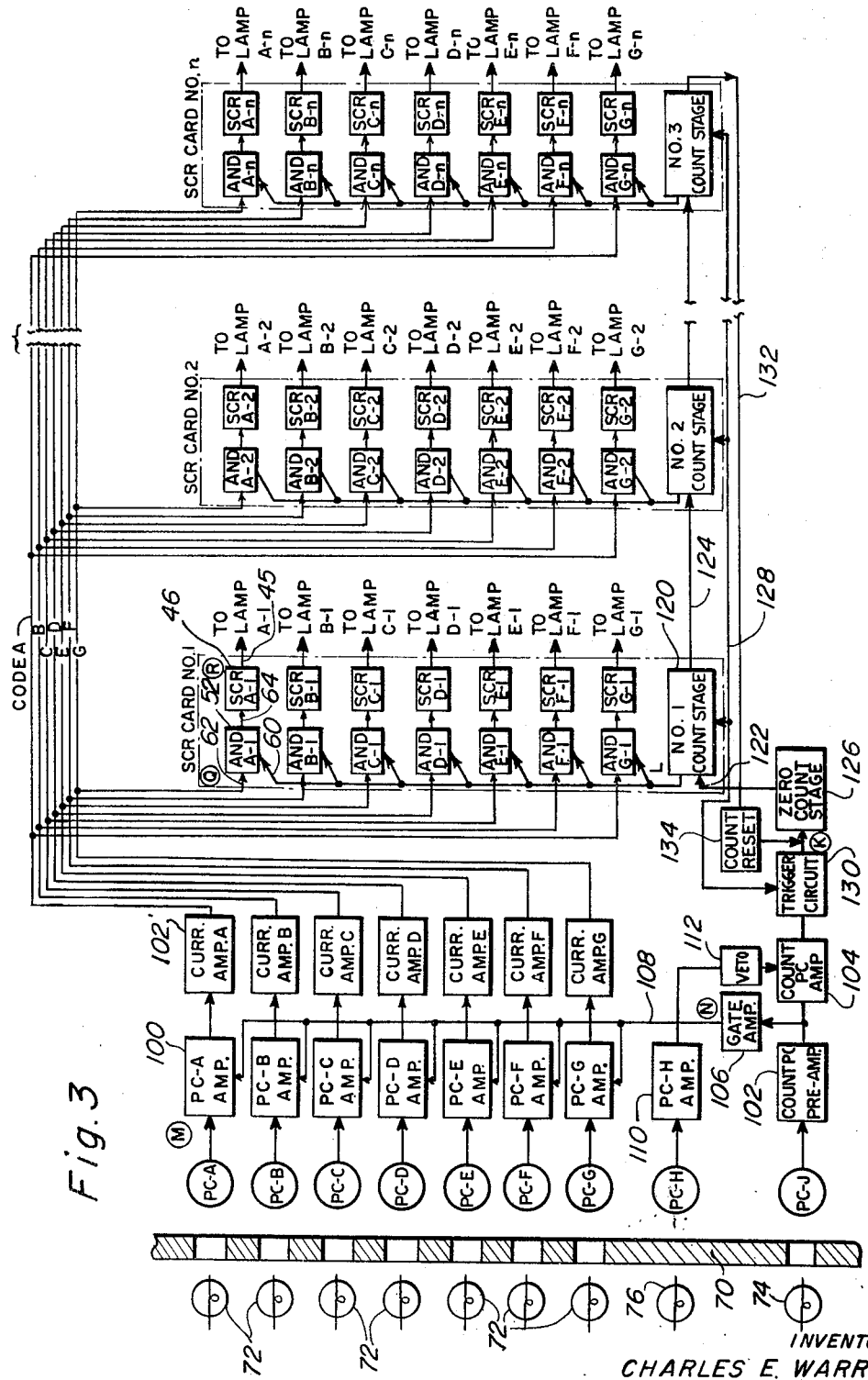

April 21, 1970   C. E. WARREN   3,508,244
VISUAL DISPLAY APPARATUS AND CONTROL THEREFOR
Filed Dec. 2, 1965   5 Sheets-Sheet 5

INVENTOR
CHARLES E. WARREN
By Silverman + Cass
ATTORNEYS

United States Patent Office 3,508,244
Patented Apr. 21, 1970

3,508,244
VISUAL DISPLAY APPARATUS AND CONTROL THEREFOR
Charles E. Warren, Perrysville, Ind., assignor to Signatrol, Inc., Danville, Ill., a corporation of Illinois
Filed Dec. 2, 1965, Ser. No. 511,127
Int. Cl. G09f 9/32
U.S. Cl. 340—324      20 Claims

ABSTRACT OF THE DISCLOSURE

Disclosed is a controlled visual display device having a bank of lamps arranged in a space coded matrix. A similarly spaced coded transducer is influenced by a coded display information card which is to be transported thereacross. A memory bank, also space coded, is interposed between the bank of lamps and transducer. Interaction initiated by the relative movement of the information card causes a wipe on effect of the visual display.

---

This invention relates generally to visual displays which are electrically energized, such as for example illuminated signs and more particularly is concerned with a visual display having a uniform field of visual display devices in which coded messages are automatically and electrically applied to the field by changing the appearance of certain particular ones of the display devices in accordance with a predetermined code to produce a specific pattern.

Particularly, modern electric signs include a type in which there is usually a permanent advertising display in large and distinctive style while at the same time there is a field of electric lamps of uniform spacing upon which different messages may be displayed from time to time. Several types of such displays are used today, involving various mechanisms for driving the same. For the most part, such displays are motor driven in that a coded member provided with contacts is moved relative to a field of feelers with the respective feelers associated with the respective lamps located on the field, so that a message moves across the field with the movement of the coded member, or card, as it is known.

Another type has a card which is moved to a position contacting all of the feelers at once so that the message appears fixed and remains so long as the card is engaged with the contacts. Other types of displays have the feelers moving over the cards or over a permanent array of contacts.

Various kinds of mechanisms are used to move the cards or feelers, and while the structure embodying the invention is intended to be provided with such a mechanism, it is not pertinent to the invention, except as mentioned hereinafer. Other electric sign features include dimming devices to account for differences in the outdoor ilumination, timing devices to turn the signs on and off depending upon the time of day, mechanisms for timing the cycles of the signs in accordance with the messages to be displayed, etc.

The principal object of the invention herein is to provide a sign in which there is a plurality of cards having coded information applied thereto, each card representing a different message, the cards adapted to be mechanically moved relative to a header, the header serving to read the code and apply the message to the field of electric lamps in a wiping action starting preferably at the beginning of the message and terminating at the end of the message.

A further object of the invention is to provide a display device in which the message is applied to the field in a wiping action, and after having been applied, remains in place for any desired length of time, after which the entire message disappears by the simultaneous extinguishment of all of the electric lamps forming the same.

A further object of the invention is to provide a display device in which the movable member carries a plurality of bits of information forming the message and such member upon moving relative to a reader transduces the bits of information into electrical signal information which is transferred to the field of electric lamps by way of memory elements such that after each memory element has been energized to be placed in one state, the control of such element is removed but the memory element retains such information transmitted to it by remaining in such one state until it is changed to another state by means other than the original control.

In connection with the above object, the use of memory elements of a bi-stable type enables momentary energizing of the control circuits to place certain of the memory elements in their one state representing the storing of information, the information being readily called up from the memory elements, either immediately, or at a later time, but in any event, the reader need only scan the movable card by the use of a small number of transducers since once a memory element has stored a bit such bit is retained although other signals from other bits may be applied through further movement of the scanning group of transducers.

An important object of the invention lies in the provision of a novel circuit for causing the memory element to change its state under control, such circuit including a coincidence circuit which is required to receive both a code signal and a count signal in order to produce a memory element control signal.

The operation of the coincidence circuit referred to in the object above may be explained in connection with a field of electric lamps uniformly spaced and having vertical columns of lamps identically located along the vertical line, and having as many columns as may be desired for the length of the message, assuming that a given number of columns will be used to produce each character. Each lamp has a memory element and a coincidence circuit. All of the coincidence circuits are electrically arranged in columns and rows. The bits of information on the card are also arranged in a similar manner and the reader includes a column of transducers which starts at one end of the card and reads the same column by column, each transducer producing an electrical signal and transmitting it to all of the lamps identically located in the row represented by the particular transducer. This continues across the entire card, and wherever there is a bit, there will be a signal to the input of every coincidence circuit in the same row. As the card moves, there will be a count signal each time that the card moves a column of bits past the column of transducers. This is preferably done slightly prior to the production of the signals from the bits. This count signal, in addition to gating the code signals, operates a ring counter of the same number of stages as columns. The stages are all initially in non-signal-producing state, and they are changed to signal-producing state column by column, so that each movement of the card from column to column can provide two input signals only to the coincidence circuits of one column at a time. In this way the message which is represented by the composition of bits of information on the card will be wiped-on to the field of lamps in a movement corresponding to the movement of the card relative to the column of transducers. Since each lamp has its own memory element, the coincidence circuits need only be rendered operative momentarily, following which it is immaterial what kind of signals are applied thereto. For example, there may be code signals from other bits. None of these will affect the memory element, since in the preferred embodiment such memory element is in the form of a bi-stable switch, which once placed in a closed circuit condition energizing the lamp, will stay in that condition until changed by means other than the control provided by its coincidence circuit.

Many objects of the invention are concerned with the provision of the apparatus described in the paragraph immediately above, and in other structural and functional features to be made apparent from the description which follows. Such description relates to the details of a preferred embodiment, which is described in the specification and illustrated in the accompanying drawings and diagrams. Since the details are capable of considerable variation, only representative circuitry is illustrated, the invention for the most part being shown in connection with block diagrams and the like.

In the drawings:

FIG. 1 is a fragmentary plan view of a card having a message formed by means of holes punched therein, the card adapted to be moved relative to a reader to produce both code and count signals.

FIG. 2 is a sectional view taken generally through the card of FIG. 1 along the line 2–2 as indicated in FIG. 1 and showing projection lamps and photocells for the purposes to be described.

FIG. 3 is a composite block diagram illustrating the apparatus of the invention, with the power source and means for driving the code card omitted.

As indicated above the invention in its practical application is embodied in an electric sign, but need not be so limited. For purposes of this explanation, however, the details of such a sign will be set forth.

Figure 4:
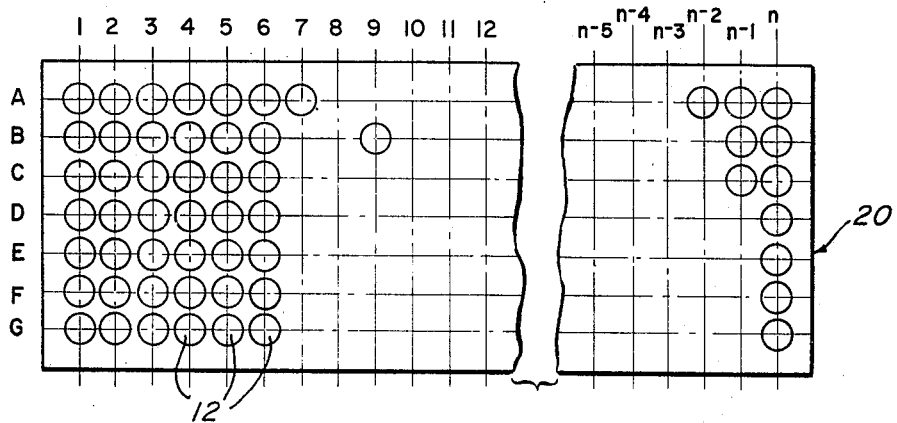
FIG. 4 is a fragmentary diagrammatic view of a bank of electric lamps used to illustrate the field referred to in the specification.

In FIG. 4 there is illustrated a sign 20 which has a plurality of electric lamps mounted thereon for purposes of producing the visual display. In the example shown the lamps are arranged in vertical columns, numbered along the top of the sign in the view by the number 1, 2, 3, 4, etc. to the last column which is designated n. The next to last column is n—1, the second to last column n—2, etc. There are 7 lamps in each column and hence, the identically positioned lamps in every column will form a row, there being seven such rows. The rows are designated A through G starting at the top. Any given lamp may be identified by its column number and row letter.

Although the columns and rows are normal to one another they could be at an angle, resulting in slanted characters as will be described. Likewise, each lamp shown as a circle in the figure could be formed of one or more lamps. These lamps are referred to in the claims as visual display devices, and thereby it is intended that they include semaphores or other surfaces which are capable of assuming different conditions of visual display. In connection with the lamps, of course, the two conditions of different visual display are illuminated and dark. They could also be illumination of one color and illumination of a second color.

The field of lamps is uniform so that message may be formed on such field by illuminating only certain predetermined lamps. For purposes of general reference, any lamp will be referred to by the character 12. Reference will be made hereinafter to other lamps used to drive certain photo-responsive devices, such other lamps being referred to as projection lamps to distinguish from lamps 12.

Figure 7:
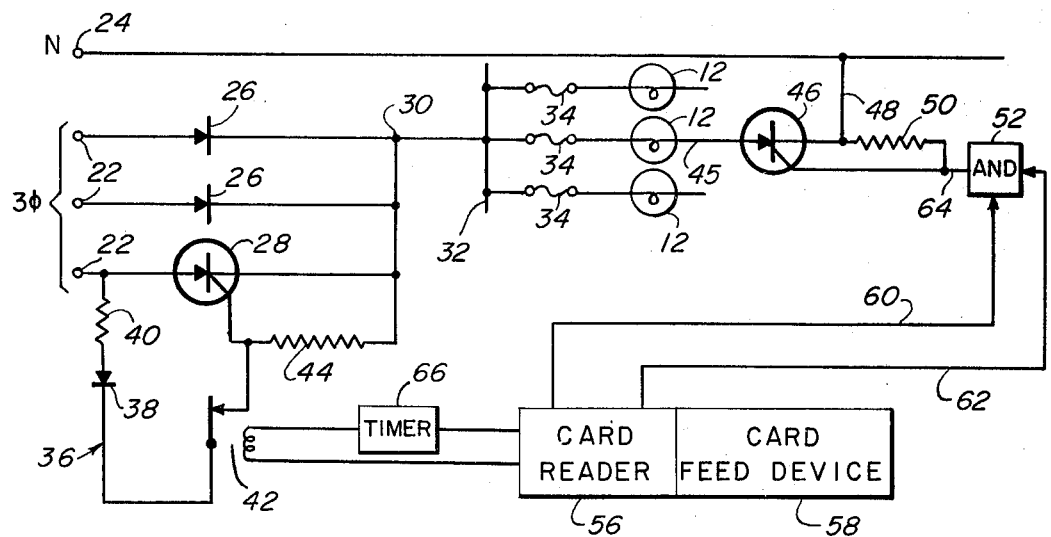
FIG. 7 is a simplified combined circuit diagram and block diagram of a representative portion of the apparatus, illustrating especially the power supply.

In FIG. 7 there is illustrated a highly simplified diagram of the general concept of the invention. At the left there is shown a three-phase alternating current source represented by the three terminals 22 of the Y type, and thus including a neutral terminal 24 connected to the line which is marked N throughout the drawings. The terminals 22 will usually be the output terminals of voltage step-down transformers of a conventional type to reduce the line voltage to a value capable of being handled by the lamps 12. Any suitable rectifier may be used to convert the alternating to direct current, but in this case there are simple rectifiers 26 in two of the lines, and a silcon controlled rectifier 28 in the third line, the anodes of all of the rectifiers being connected to a single terminal 30 from whence there is a buss line 32. All lamps 12 feed from this buss line 32 through fuses as shown at 34, only three such connections being illustrated in FIG. 7. The center lamp 12 is the only one in the view which has a complete circuit.

Reference will be made in the claims to signal controlled rectifiers. In such instances it will be intended that this means a rectifier of the so-called silicon controlled type, but it is not desired to limit the scope to such rectifiers in which the semi-conductor material is silcon. All reference in the specification to such devices will be by the designation SCR.

In FIG. 7, the SCR 28 provides a novel way of momentarily cutting off the power supply for a purpose to be described. This SCR 28 has a gate signal circuit 36 through a diode 38, resistor 40 and a relay 42. The switch of this latter relay is normally closed, so that the gate electrode of the SCR 28 which is connected to its own anode through the resistor 40 and diode 38 will receive the necessary gate signal, and to all intents and purposes the SCR 28 acts as an ordinary rectifier. There will always be a signal of some kind at 30, but if any one leg of the power supply is opened, this terminal will be at zero potential for one sixth of each cycle.

The lamps 12 are connected from the power buss 32 through individual SCR's to the neutral line N. In FIG. 7 the central lamp 12 is shown connected to an SCR 46 the cathode of which connects by way of the conductor 48 to the line N. Every lamp has such an SCR. The gate electrode of the SCR 46 is connected to its cathode through the resitsor 50. The SCR 46 will conduct any time there is a positive potential applied to its gate electrode. This potential is produced any time there is an output signal from a coincidence circuit 52 connected in circuit with the gate electrode of SCR 46.

Assuming that the SCR 46 has been rendered conductive, current will flow through it and the lamp 12 which is in series with such SCR 46, thereby illuminating the lamp. Once the current flows, the gate or control circuit including the resistor 50 and the coincidence circuit 52 loses control, and it becomes immaterial what kind of signals are applied through the control circuit. The lamp 12 remains lit from that point on.

In effect, therefore, the SCR 46 is a memory element, and it has two states—one in which it conducts current, and the other in which it is non-conductive. It acts like a bi-stable switch in that once the switch has been placed in a close circuit condition, it remains in such condition as though it were locked up. The only way that the state of the memory element can be changed is to remove the potential across the SCR 46, even if only momentarily. This having been done, the control circuit acquires control again.

In order to remove the potential from the memory element 46, the relay 42 may be operated to open the switch thereat and remove gate signal from the SCR 28 when A.C. in that branch drops to zero. The short portion of the cycle at which there is no poential at 30 is sufficient to revert all of the SCR's in circuits similar to that of SCR 46 to open circuit condition, as a result of which all of the lamps 12 will be extinguished. This is a convenient way of doing this for all of the lamps of the sign 20, but if desired, there could be a simple relay operated switch in the connection from the terminal 30 to the buss 32, or the buss 32 may be divided into several groups and the lights of that group extinguished at different times by merely opening the circuit momentarily.

The control of memory elements is obtained through a plurality of coincidence circuits such as the circuit 52, which is marked AND in FIG. 7. The message or intelligence which is to be displayed on the field of lamps is contained on a card which is read by the card reader, designated generally 56 in FIG. 7. This card is moved through the reader 56 by a feed device designated generally 58 and there are transducing means which read the bits of information stored on the card column by column. Each time that there is a bit of information read in any given column it applies one signal to all of the coincidence circuits of the row involved, as for example to the AND circuit 52 of FIG. 7 by the way of a channel which is designated generally 60. At the same time there is a code signal produced by the movement of the card, and this signal occurs column by column as the card moves along the equivalent columns of bits. If the AND circuit 52 happens to be in the particular column which simultaneously receives a code signal by way of the channel designated generally 62, then there will be an output signal at 64, but not otherwise. In this manner, all of the lamps making up a message or display can be illuminated through the use of a single column or group of transducers, the card being moved across the transducers to enable the reading of the information on the card.

The actual circuitry for accomplishing the functions described above is somewhat more detailed than indicated, but this will be explained further. At this point it should be understood that the columns could be energized in groups or multiples, and the memory elements could be permitted to retain the information fed to them for a period of time prior to causing them to energize their respective lamps. For example, in place of the lamps 12, there could be simple relays or other elements which, although energized are not permitted to close circuits to the lamps until all have been so energized. In this manner, the message is scanned by the reader, and the entire display illuminated at once. In the practical structure, as described herein, the specific operation is in the forming of a wiping on process.

The card reader 56 is connected to operate the relay 42 through a suitable timer 66 at the end of the message. If desired this timer may be set to energize the other means described for momentarily interrupting the potential on the SCRs equivalent to 46 to extinguish the display.

In FIG. 1 there is illustrated a so-called card 70 which carries the information of the message thereon. The information is coded, since it is intended that the bits forming the information will be de-coded or transduced to produce electrical signal information in the form of a message. This message will appear as the display on the sign 20. In the particular instance, the card is of heavy flexible opaque plastic, in the form of a strip which is relatively thin. The bits of information are formed as holes punched through the card, such holes being shown formed in columns which are numbered consecutively to the end of the strip from left to right. There are as many columns of holes as there are columns of lamps in the field of the sign 20. It will be seen that the first column of the card 70 which has any holes punched in it is the column designated 6, and hence it is expected that there will be no lamps of the first 5 columns illuminated as a result of the message carried by the card.

Holes are punched in the columns 6, 7, 8, 9, 11, 13, 14, 15 and 16, and such holes will be noted to outline the letters S, I and G respectively. In this manner the entire message has a predetermined spatial composition to represent an eventual visual display of the lamps which represent this same spaatial composition. The bits of information in this instance are the holes punched in the card, but they could as readily be transparent areas suitable for use with photoresponsive devices, magnetic bits operating with a magnetic pick-up head, and the like. In the preferred embodiment, the holes form passageways through which light may pass.

In FIG. 2, a sectional view has been taken through the holes of column 9, there being three such holes. As in the case of the lamps 12, the holes may be identified by column and row, such that the particular holes mentioned comprise the holes 9B, 9E and 9F. These form the right hand edge of the letter S. The row of holes designated J will be explained hereinafter.

According to the invention, there is a column of transducers which is intended to transduce the information represented by the bits into the electrical signal information. This information is produced column by column, because in the structure shown there are seven transducers corresponding to the seven lamps of each column. Thus there is a transducer for each lamp. Each transducer comprises a projection lamp on one side of the card 70 and a photocell on the other side. The photocells are designated PC–A through PC–G corresponding to the rows, and the projection lamps are designated 72. There could be more or less of the projection lamps. The photocells are aligned with the rows, so that if there is a hole in any given column and row, as that particular column passes the column of photocells there will be a change in the circuit containing the photocell. For example, there can be a flow of current when there is a hole and none when there is not. The reverse can be arrangd, by suitable change in the structure. The electrical signal information transmitted by the entire card moving relative to the transducers is made up of components, for example the presence or absence of signal on certain lines, and a parameter of each component is a function of each bit, or hole and its location with respect to the other holes. This will become more apparent with further explanation.

In FIG. 2 there is a hole at the bottom which is designated J–9 cooperating with a projection lamp 74 and a photocell PC–J. There is also a projection lamp 76 cooperating with a photocell PC–H and if examined with reference to FIG. 1, the row which would be designated H is imperforate, and hence the projection lamp 76 will not impinge against the photocell PC–H unless the card 70 is not in place. This provides a relatively simple manner of preventing illumination of any lamps unless there is a card in the reader, as will be pointed out.

The bits of information on the card which form the spatial composition will vary from card to card, and since the visual display will be produced by the movement of the card, a large number of cards may be read one after another through the use of the card feed device 58 which chooses the card, passes it through the reader 56 and stores it. This can be a continuous cycle, using mechanisms which are readily devised from known art. The information transmitted by the bits is referred to as code information. The bits are used to produce code signals, as referred to herein.

The row of holes designated J has no equivalent row of lamps 12. The only purpose of this row of holes is to count the passing columns, and hence, instead of using the photocell-lamp combination for obtaining a signal, any suitable signal producer working in synchronism with the card movement could be used. The one shown in this embodiment is simple because it is related time-wise with the information bits by simple spacing of holes on cards. The signals produced by the J row of holes are called count signals. There is a hole in the J row for every column of lamps and for every column of code holes, regardless of whether there actually are code holes in a given card. There may be additional J holes as well, as for example for purposes of re-set. The hole J–*nn* produces a signal which can be used for almost any kind of re-set purpose.

The count hole for any given column is spaced ahead of the occurrence of the column of code holes so that the count signal is produced or started before the advent of the code signal for the particular column.

Figure 5:
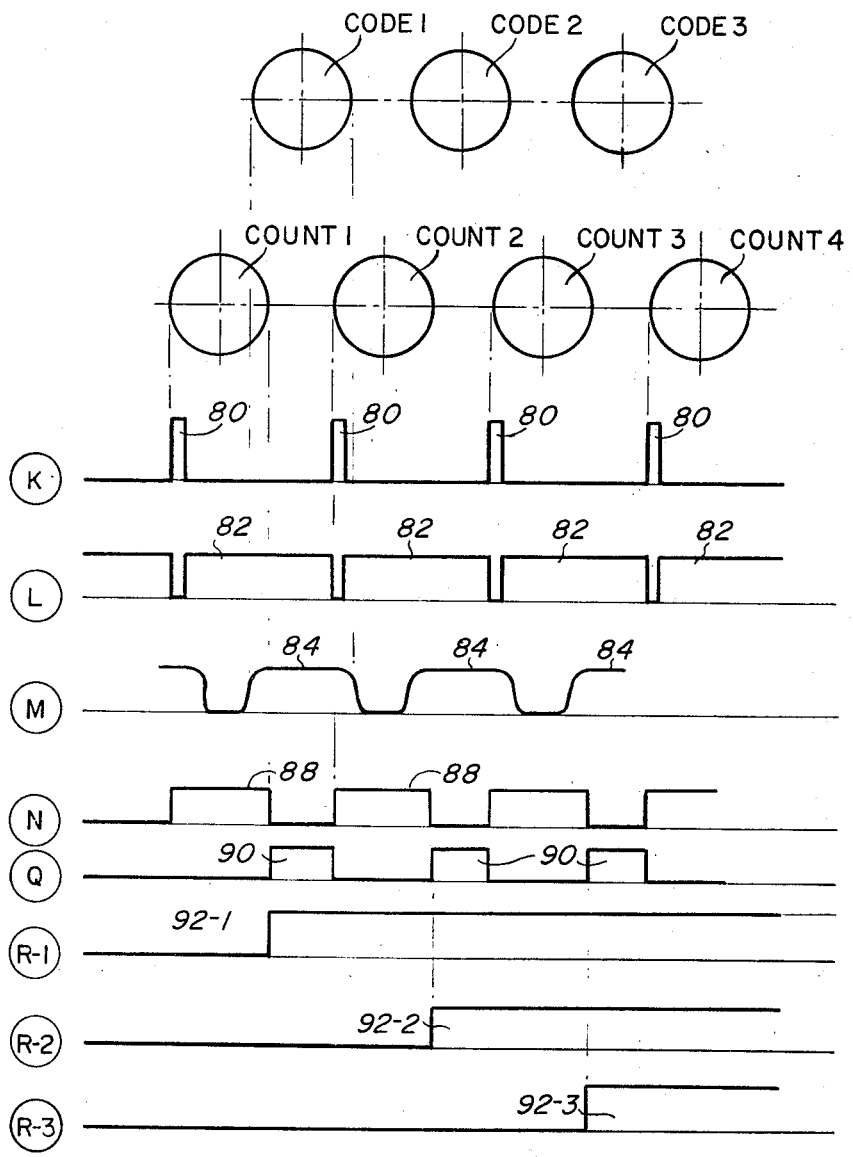
FIG. 5 is a composite view of a plurality of graphs on the same time scale but with no particular voltage or current scale, used to explain the operation of the apparatus.

In FIG. 5 there are a series of graphs all occurring on the same time axis to illustrate the operation of the apparatus of a practical device. The upper circles represent to a fairly accurate scale the proportional spacing of the code holes and count holes of a given card. The holes are designated Code 1, Code 2 and Code 3 and are assumed to occur in the same row, while the count holes are designated Count 1, Count 2, Count 3 and Count 4. The holes may be assumed to retain their relative spacing and position and all to pass relative to a vertical column of transducers. It is intended for this structure that all of the transducers will be aligned so that the count hole for any given column will pass light to its photocell before the code holes of the same column. In this manner there is a slight delay before the code photocells are energized. Of course this same thing can be done with other geometric arrangements, by the use of delay lines, etc.

The count holes perform two functions. They gate the signals from the code holes and they transfer the column coincidence count signal from column to column. In graph K, as each count hole passes the photocell PC–J it produces a trigger pulse 80 which turns on the stage of the ring counter associated with the equivalent column of coincidence circuits. The trigger pulse 80 thus produces a count signal 82 shown in graph L. This count signal is quite wide and extends as seen from the trailing edge of the trigger pulse 80 of count hole 1 to the beginning of count hole 2 and so on.

As soon as the code hole 1 passes between the projection lamp 72 and its particular photocell, as for example, PC–G, a signal will start in the photocell circuit, and will continue so long as the photocell is exposed. These signals are shown at 84 in the graph M and have irregular shapes due to variations in the responses of photocells. They would overlap the count signals 82 applied to the coincidence circuits 52 of consecutive columns if not cut down in duration, so that it would be possible for two consecutive lamps in the same row in adjacent columns to become illuminated even though there was no code signal corresponding to the lamp in the second column in that row. This problem arises only where the code holes are so close that a complete decay of code signals from column to column is not assured. It could also arise in high speed reading. It could be eliminated by spacing the columns of holes or increasing the sharpness of the code signals obtained from the code photocells.

In the structure herein, the signal from the photocell PC–J is used to produce a gate signal 88 as shown in graph N of FIG. 5 whose duration is the same as the time that the count hole is exposed. This gate signal is used to permit only the portion 90 (graph Q) of the code signal to pass to the coincidence circuit of that particular column and row. Thus, there is no overlap of code signals.

In graph R–1 the count and code signals have permitted an output from the coincidence circuit such as AND circuit 52, to the memory element, such as SCR 46, as a result of which the memory element passes current lights the associated lamp 12. This is indicated by the signal 92–1 which does not decay once having started. The other graphs R–2 and R–3 display signals 92–2 and 92–3, representing memory elements turned on by the coincidence of signals from code hole 2 with count hole 2, and from code hole 3 and count hole 3. These signals will discontinue when the memory elements revert to their open circuit condition by removal of potential from the SCR's forming the same.

FIG. 3 is a block diagram illustrating apparatus constructed in accordance with the invention, but without the power supply. The card 70 is shown at the left with the projection lamps, holes and photocells as in FIGS. 1 and 2. The photocells are circles, each designated in accordance with its row. PC–A through PC–G are code photocells, PC–H is the photocell to prevent operation when no card is present and PC–J is the count photocell. In the view the graphs of FIG. 5 are related to locations designated by the same letter.

The code signals are amplified in suitable photocell signal amplifiers shown at 100, there being seven of these. Also there is a current amplifier or other driving circuit shown at 102' to provide sufficient power to operate the coincidence circuits. These pairs of components operate into seven channels designated Code-A, Code-B, Code-C through Code-G. Each channel is connected to all of the coincidence circuits of its particular row so that any signal appearing on this channel will be applied to every coincidence circuit of that row.

In the view there are three blocks which are designated SCR Card No. 1, SCR Card No. 2 and SCR Card No. n. These are modules or integrated circuits, and there is one such module for each column. Each module or card contains seven coincidence circuit, seven memory elements and a count stage. Thus, the first module has AND elements the same as the coincidence circuit 52 of FIG. 7, these being marked in their blocks by the row and column. The memory elements of the particular module are likewise identified by SCR row and column data. The same reference numerals of FIG. 7 are applied to several of the parts of the first module SCR Card No. 1 to show the equivalence. The character 45 is applied to a line which extends from the module to the particular associated lamp.

The count photocell PC–J has its signal amplified in an amplifier 102 which has its output connected to a driver amplifier 104 and a gate circuit 106. The gate circuit produces the gate signal 88 shown in graph N and applies it on the line 108 to the code photocell signals. This results in the output of narrow duration described as signal 90 in graph Q. The techniques for achieving this form of gating are known to those skilled in the pulse-shaping art. The interconnection of components to accomplish this is not intended to be limiting, but merely suggestive.

At this point it might be appropriate to point out the manner of using the no-card feature. So long as there is a card 70 in place the photocell PC–H sees no light, but when the card is removed there will be a signal amplified at 110 applied by means of a veto circuit 112 to the output circuit of the count photocell. For example, it could produce some form of bias or removal of bias which prevents the amplifier 104 from producing an output. It could be in the form of a coincidence circuit which is interposed in the channel from the count amplifier. This prevents any lamps 12 from being lit.

Each module has a stage of a ring counter, the stages being designated in accordance with its module or column. The first is shown at 120. These stages normally have no output but are connected by the line 60 to all of the coincidence circuits of the particular module. There is an input line for each stage, shown at 122 on the left side of the No. 1 count stage, and there is an output at the right at 124. For any stage, except the first and last, the input of one comes from the previous stage's output. As for the input 122, it extends from a zero cont stage 126 the purpose of which is to flip the first count stage, since the latter has no previous stage to do so. All stages are in no output condition at the beginning of a cycle (starting a card through the reader). Each stage is triggered by the trigger pulse shown in graph K along the line 128 obtained from a trigger circuit 130. Thus the pulse L is produced as an output of the count stages column by column, until the last stage which is designated No. n. As each stage produces its pulse it places the following stage in condition to be triggered. The pulse from the last stage is applied on the line 132 to a count reset circuit 134 which resets the zero count to operate when the next trigger pulse arrives with the insertion of the next card into the reader.

Operation of the apparatus is obvious from the above explanation. Each count signal applies a signal to the coincidence circuits of each consecutive column, and if a code signal comes in on any row of that column while there is an input to its particular coincidence circuit, the associated SCR will conduct and lamp will light and stay lit until the power is momentarily cut off.

It will be understood that the ring counter stages will have an output only once for each card, since the count is passed from one to the other, and recirculated back to the zero count stage.

Figure 6:
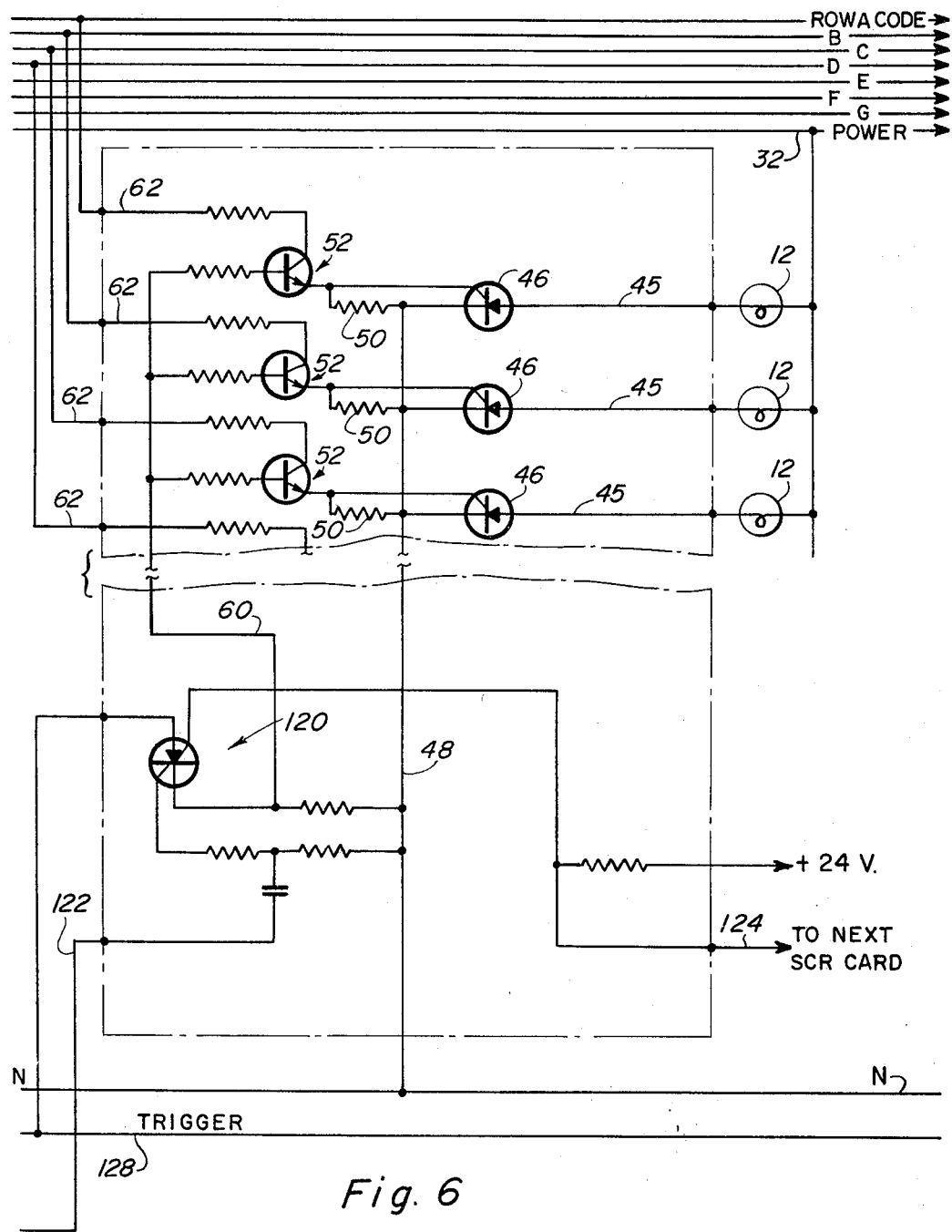
FIG. 6 is a circuit diagram of the memory elements, coincidence circuits and the stage of ring counter, all associated with a single column of lamps of the apparatus.

In FIG. 6 there is illustrated a module such as designated SCR card in FIG. 3. The reference characters of FIGS. 3 and 7 have been applied to the equivalent parts in this view. The coincidence circuit 52 in each case comprises a transistor whose base is connected by the line 60 to the ring counter stage 120 and whose collector is connected to one of the code lines by the line 62. Thus the code and count signals must occur simultaneously in each transistor in order that there be an output. As soon as there is an output, the particular SCR 46 is turned on, lights its lamp, and the gate circuit loses control. The lamp stays lit, regardless of what happens thereafter in the transistor connected with it. There will continue to be signals applied at the lines 62 as the card moves across the column of photocells, but since there is a count signal only once for each cycle there will be no change in the number of lamps of any given column lighted, once the line of holes corresponding to that column has passed the column of photocells.

The ring counter stages 120 is a so-called SCS, manufactured by the General Electric Company. It is the equivalent of two transistors connected into a flip-flop circuit to be used as a stage of a ring counter.

What it is desired to secure by Letters Patent of the United States is:

1. A visual display apparatus, comprising:
    (A) a member having coded information bits incorporated therein of a predetermined spatial composition,
    (B) a plurality of visual display devices each capable of assuming two conditions of different appearance, said plurality of display devices being arranged in a relatively uniform field,
    (C) means for transducing the composition of bits into electrical signal information having a plurality of components, a parameter of each component being a function of each respective bit, said means including
        (i) a plurality of tarnsducers responsive when brought into transducing relationship with said bits to produce the components of said electrical signal information, and
        (ii) means for moving said member and said plurality of transducers relative to one another whereby to bring the transducers and bits into such transducing relationship,
    (D) electrical memory element means comprising, a plurality of electrical memory elements, each memory element being associated with a respective display device and being capable of assuming two states,
    (E) means coupling each display device with its associated memory element and each display device having one of said conditions of appearance when its memory element is in one state and a second of said conditions of appearance when its memory element is in a second state, and
    (F) means for transmitting the components of said electrical signal information to the individual memory elements during said relative movement of member and transducers, including means to cause only certain ones of the memory elements to assume one of said states in accordance with the relative locations of the bits with respect to one another in said spatial composition, whereby to cause the associated visual display devices to assume an appearance different from all others in said field and provide a visual display related to said spatial composition of bits.

2. Apparatus as claimed in claim 1 in which the memory elements comprise multi-stable switch elements and the visual display devices comprise electric lamps, each switch element and its associated lamp being connected together, the said states of the memory element comprising open-circuit and closed-circuit state of said switch element, the two conditions of the display device being illuminated and non-illuminated conditions of said electric lamp, the apparatus including a source of electric current connected to all of the switch elements and lamps and means for disconnecting said source, each switch element when placed in a state causing illumination of its associated lamp by the receipt of a component of the electrical signal information remaining in such state after the latter component has been removed until the said source is disconnected from said switch element.

3. Apparatus as claimed in claim 2 in which the multi-stable switch elements are signal controlled rectifiers having gate electrodes, each being connected in series with its associated lamp and to said source of said state causing illumination being closed-circuit, the means for transmitting the components of said electrical information including a gate circuit connected to the gate electrode of each rectifier, respectively.

4. Apparatus as claimed in claim 1 in which the field of display devices is arranged in groups positioned consecutively along one dimension of the field and there being the same number of devices in each group identically positioned consecutively along a second dimension of the field transverse of said one dimension, the number of transducers being equal to the number of devices in a group, the said spatial composition of bits being with reference to said groups and the positions of the devices within the groups, the movement of the member and transducers relative to one another serving to cause the composition to be read group by group so that the electrical signal information is transmitted group by group whereby the visual display is produced in a wiping-on-effect.

5. Apparatus as claimed in claim 4 in which the means for transmitting the components of said electrical signal information comprise:
    (A) a plurality of AND circuits, each having an output circuit and each output circuit being connected to one of the respective memory elements for placing said memory elements in one state when there is an output signal, and each AND circuit having two input circuits,
    (B) all of the first input circuits of the AND circuits connected with the memory elements associated with one display device in the same position of every group being connected to one of the transducers whereby each time that a component of said electrical signal information is produced in said transducer it will be applied to all of the AND elements connected therewith,
    (C) a counting device operated in synchronism with the movement of the member relative to the transducers for producing a count signal for each passage of the transducers relative to a group of bits corresponding to a group of display devices,
    (D) a ring counter having a plurality of switching stages sequentially connected to respond to said count signal to produce an output signal consecutively and each stage having a connection with all of said AND circuits corresponding to a single group, whereby there is at least one such stage for each group, and
    (E) said movement causing only certain AND elements of each group to produce output signals corresponding to the location of bits, group by group.

6. Apparatus as claimed in claim 4 in which means are provided to restore said display devices all to the same condition of appearance following the completion of a visual display.

7. Apparatus as claimed in claim 5 in which means are provided to restore the ring counter stages to non-signal producing condition after a completion of movement and in which means are provided to restore said display devices all to the same condition of appearance following the completion of a visual display.

8. Apparatus as claimed in claim 1 in which the said member is a card and said coded information bits comprise translucent passageways in said card and in which the transducers comprise photo-responsive elements arranged on one side of the card, and the card having light source means on the opposite side whereby as the card and photo-responsive elements are moved relative one another, only those passageways which are provided in said card will permit light to impinge against the particular photo-responsive elements suitably disposed adjacent thereto and only such photo-responsive elements will produce said electrical signal information.

9. Apparatus as claimed in claim 8 in which the photo-responsive elements are stationary and means are provided for moving the card relative to the photo-responsive elements, the field of display devices comprises a bank of electrical lamps formed of horizontal rows and columns transverse of the rows, the card has its passageways arranged in similar columns and rows, with only selected ones forming said predetermined spatial composition, the light source means comprise a column of individual projection lamps, there are as many photo-responsive elements as projection lamps and display devices in a column, and the projection lamps and photo-responsive elements are aligned, and the movement of the card is parallel to the rows of passageways.

10. Apparatus as claimed in claim 9 in which the memory elements are electrically arranged in columns and rows corresponding to the columns and rows of the electric lamps, each column of memory elements is adapted to be energized to one state as the corresponding column of passageways of the card passes between the column of photo-responsive devices and projection lamps, and means are provided operated by the movement of the card to transfer the electrical signal information from column to column simultaneously with the said movement to enable those memory elements of each column which have an equivalent passageway in said card, to be energized.

11. Apparatus as claimed in claim 10 in which the transfer means comprise
   (A) a coincidence circuit connected with each respective memory element and adapted to energize its memory element to said one state when two input signals are applied to said coincidence circuit,
   (B) each photo-responsive device being connected to all of the coincidence circuits corresponding to a row of electric lamps,
   (C) means producing a count signal in timed relationship with the passage of each column of passageways relative to the column of photo-responsive elements,
   (D) a ring counter having a plurality of stages, each stage being connected to all of the coincidence circuits corresponding to one column of electric lamps whereby there is at least one stage for each column, the count signal producing means being connected to the ring counter so as to cause each stage to register a count consecutively to provide the second input to all of the coincidence circuits of each column consecutively.

12. Apparatus as claimed in claim 11 in which the count signal producing means comprise a row of passageways in said card independent of those arranged in said spatial composition, a light source on one side of the card and a photocell on the other side of the card, there being as many passageways as columns, and the count signal being produced when light from said light source illuminates said photocell.

13. Apparatus as claimed in claim 11 in which means are provided to prevent the production of count signals when there is no card between the photo-responsive devices and the projection lamps.

14. An illuminated display, comprising
(A) a bank of electric lamps arranged in rows and columns, certain ones of said lamps adapted to produce a predetermined pattern of illumination on said bank,
   (1) each lamp being in circuit with a source of electric power and a bi-stable switch element,
   (2) there being one switch element individual to each lamp and each switch element having control means which, upon being at least momentarily energized places its switch element in stable, closed circuit condition,
(B) an AND element individual to each lamp circuit,
   (1) each AND element having first and second input circuits and an output circuit,
   (2) the output circuit being connected with the control means of the switch element of its lamp circuit and adapted to energize the control means when control signals are applied simultaneously to both of its input circuits;
(C) control signal producing means, comprising
   (1) a strip-like opaque member having a plurality of translucent code passageways therethrough of selective arrangement to produce said predetermined pattern of illumination,
   (2) a line of photo-responsive devices and a line of light sources aligned with and illuminating the respective photo-responsive devices, there being at least as many of said photo-responsive devices as light sources and as the number of lamps in each column of said bank and hence as the number of rows of lamps,
   (3) means for moving the opaque member between the light sources and devices,
   (4) the code passageways being arranged in a plurality of columns extending transverse of the direction of movement and the rows extending in the direction of movement, and each column having at most the same number of code passageways as the number of photoresponsive devices and being aligned therewith so that as the opaque member is moved, only those photo-responsive devices of the line will be illuminated by their respective sources for each column of code passageways as there are code passageways and only if there are code passageways, and each photo-responsive device producing a code signal when illuminated,
   (5) the opaque member having sufficient length to accommodate as many equally spaced columns of code passageways as there are columns of lamps in said bank,
   (6) a counting device for producing count signals and connected with said means for moving said opaque member to produce a count signal in timed relationship to the movements of said opaque member,
(D) means for coupling the control signal producing means to the AND elements for illuminating said bank of lamps, comprising
   (1) means connecting the counting device to all of the first input circuits of the AND elements of the lamp circuits column by column consecutively with movement of the opaque member, and
   (2) means for connecting the photo-responsive devices respectively to all of the second input circuits of the AND elements of each row of lamp circuits, whereby to apply a code signal thereto with each movement of said opaque member depending upon whether there is a code passageway in said opaque member at the column aligned between photo-responsive devices and light sources for the particular row, whereby selected lamps of said bank will be illuminated column after column and remain illuminated, (E) and means for de-energizing all switch elements to extinguish said bank of lamps after the opaque member has completed a predetermined amount of movement relative to said line of photo-responsive devices.

15. An illuminated display as claimed in claim 14 in which the means for connecting the counting device comprises
   (A) a plurality of two-state devices each having a first state producing an output signal, a second state producing no output signal,
   (B) a connection from each two-state device, respectively to all of the first input circuits of the AND elements of the lamp circuits such that there is one such circuit corresponding to each column of lamps,
   (C) and means coupling the two-state devices together to operate consecutively as a ring counter, and to said counting device.

16. An illuminated display as claimed in claim 15 in which means are provided to reset at least the first two-state device to its second state after the last one has been placed in its first state.

17. An illuminated display as claimed in claim 14 in which said counting device comprises an independent row of count passageways on said member and a count photo-responsive device and light source arranged on opposite sides of the opaque member and adapted to produce a count signal for each count passageway of said row, there being at least as many count passageways along the length of the opaque member as columns of code passageways can be accommodated on said opaque member, and there being a count passageway related space-wise to each particular column of code passageways, if present, and to a particular column of lamps.

18. Control means for a visual display apparatus having an array of display lamps which are to be illuminated in a wipe-on mode to display information originating from a coded member carrying the information in format related to the wipe-on mode, said control means comprising:
   a reader device constructed to receive the coded member, read the coded information, and transmit same progressively corresponding to the format and the wipe-on mode, said reader device including means for transmitting count signals indicative of the wipe-on format position of the coded information then being transmitted, a prticular bit of coded information and its associated position count signal being transmitted in coincidence as outputs from said reader; an input connected to receive a source of D.C. power; an array of controlled rectifiers each separately in series circuit with said input and arranged to be in series circuit with a corresponding one of the display lamps; an array of coincidence circuits coupled to receive the outputs of said reader and to energize a corresponding one of said controlled rectifiers; and means for disconnecting said input from at least one of said controlled rectifiers.

19. Control means according to claim 18 in which said disconnecting means comprises a latching switch coupled in series between said input and the anode of said controlled rectifier.

20. Control means according to claim 19 in which said latching switch comprises the combination of a silicon controlled rectifier and switch means coupled to the gate of said silicon controlled rectifier, said switch means connected to be responsive to a disable control signal from said reader device to thereupon change the state of said switch means and thereby turn off said silicon controlled rectifier to effectively open circuit the series circuit of said input, said controlled rectifier and the corresponding display lamp.

References Cited

UNITED STATES PATENTS

| | | | |
|---|---|---|---|
| 2,123,459 | 7/1938 | Andersen | 340—339 |
| 3,106,696 | 8/1963 | Foley | 340—154 |
| 3,222,666 | 12/1965 | Hallden | 340—324 |
| 3,384,888 | 5/1968 | Harnden et al. | 340—339 |
| 3,387,269 | 6/1968 | Herman et al. | 340—339 |
| 3,389,389 | 6/1968 | Minear | 340—339 |

JOHN W. CALDWELL, Primary Examiner

M. M. CURTIS, Assistant Examiner

U.S. Cl. X.R.

178—17; 340—154, 334, 339